United States Patent
Bishop, Jr.

(10) Patent No.: US 6,575,527 B1
(45) Date of Patent: Jun. 10, 2003

(54) VEHICLE HEADLINER ASSEMBLY AND METHOD OF INSTALLATION

(75) Inventor: James E. Bishop, Jr., Plymouth, MI (US)

(73) Assignee: Advantage Mobility Outfitters, Inc., Wayne, MI (US)

( * ) Notice: Subject to any disclaimer, the term of this patent is extended or adjusted under 35 U.S.C. 154(b) by 0 days.

(21) Appl. No.: 09/775,212

(22) Filed: Feb. 1, 2001

Related U.S. Application Data

(60) Provisional application No. 60/222,315, filed on Aug. 1, 2000.

(51) Int. Cl.⁷ .............................................. B60R 13/02
(52) U.S. Cl. ........................ 296/214; 296/39.1; 280/751
(58) Field of Search ................................ 296/189, 214, 296/39.1, 188; 280/751

(56) References Cited

U.S. PATENT DOCUMENTS

| | | | |
|---|---|---|---|
| 4,020,207 A | 4/1977 | Alfter et al. | 428/138 |
| 4,131,702 A | 12/1978 | Alfter et al. | 428/76 |
| 4,150,850 A * | 4/1979 | Doerfling | 181/294 |
| 4,358,883 A | 11/1982 | Gerring | 29/401.1 |
| 4,836,871 A * | 6/1989 | Kato | 156/79 |
| 4,840,832 A | 6/1989 | Weinle et al. | 428/156 |
| 4,886,696 A | 12/1989 | Bainbridge | 428/184 |
| 5,057,176 A | 10/1991 | Bainbridge | 156/222 |
| 5,182,158 A | 1/1993 | Schaeffer | 428/178 |
| 5,290,622 A | 3/1994 | Tanabe | 428/182 |
| 5,503,903 A | 4/1996 | Bainbridge et al. | 428/182 |
| 5,536,556 A * | 7/1996 | Juriga | 181/284 |
| 5,660,778 A | 8/1997 | Ketcham et al. | 264/630 |
| 5,833,304 A | 11/1998 | Daniel et al. | 296/214 |
| 5,866,235 A | 2/1999 | Fredrick et al. | 428/182 |
| 6,004,651 A | 12/1999 | von Montgelas et al. | 428/113 |

* cited by examiner

Primary Examiner—D. Glenn Dayoan
Assistant Examiner—Lori L Coletta
(74) Attorney, Agent, or Firm—Lynn E. Cargill; Mary H. Powell

(57) ABSTRACT

A semi-flexible vehicle headliner assembly and a method of installing the same are provided. The headliner assembly includes a headliner piece and a support unit. The headliner piece is bendable to permit variable shaping for installation. A method of installing the headliner assembly with an upper surface to the inside of a vehicle roof is provided which includes the steps of connecting a back side of a support unit to the inside of the vehicle roof and connecting the upper surface of the substrate to the roof of the vehicle temporarily until the substrate can be securely installed.

30 Claims, 3 Drawing Sheets

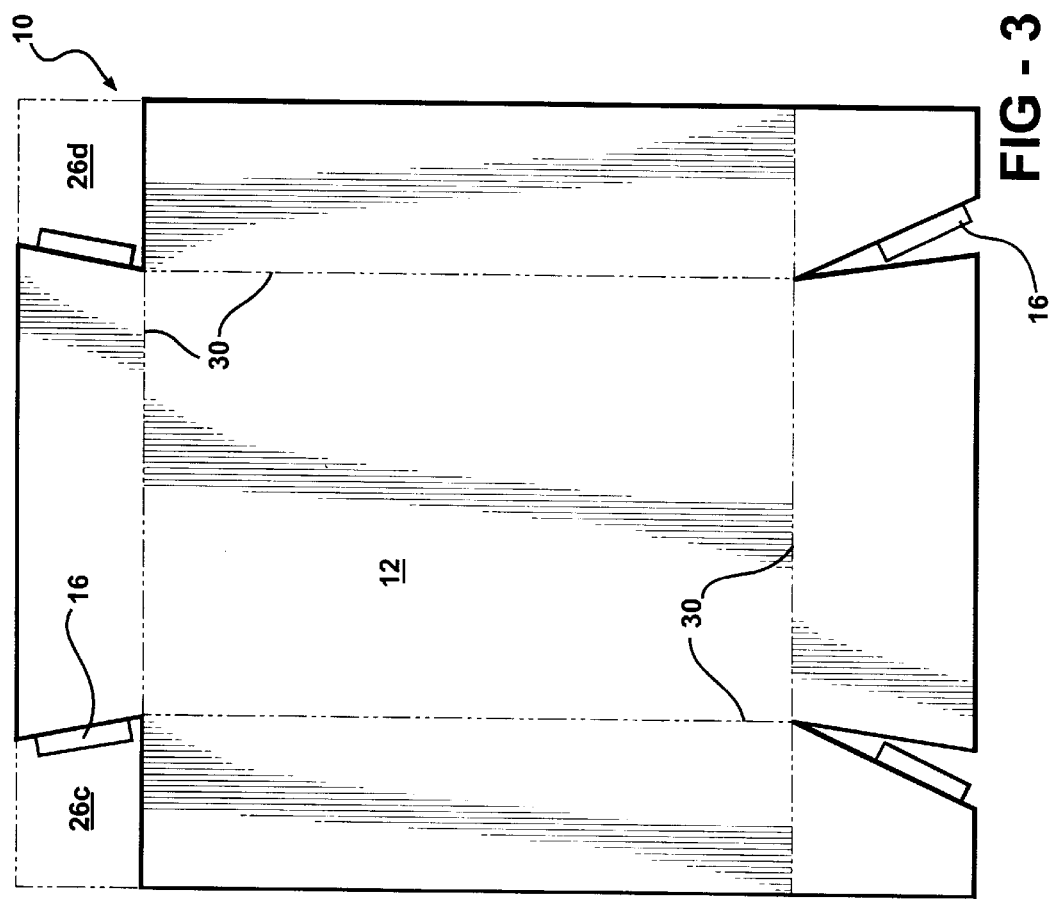
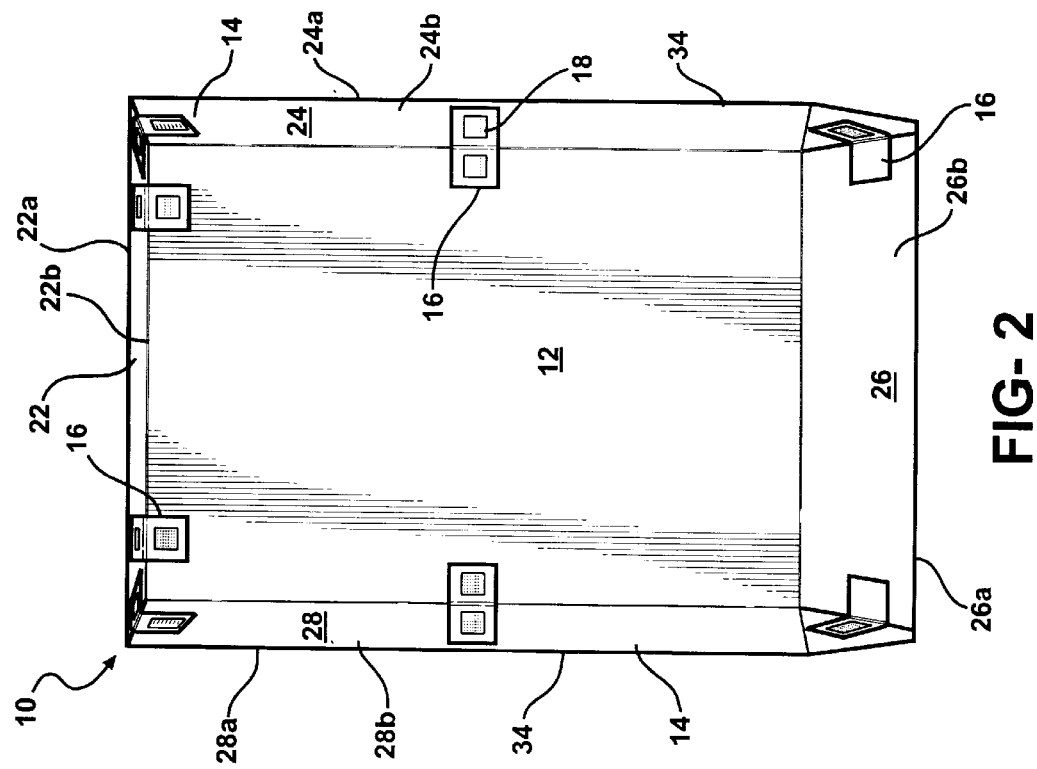

VEHICLE HEADLINER ASSEMBLY AND METHOD OF INSTALLATION

CROSS REFERENCES TO RELATED APPLICATIONS

This application claims the benefit of U.S. Provisional Application No. 60/222,315 filed on Aug. 1, 2000.

TECHNICAL FIELD

The present invention relates generally to headliners and a method of installing a headliner. More particularly, the present invention relates to headliners for vehicles, containers, or the like including, but not limited to, boats, cars, trucks, vans, trains, planes and cages, as each of these containers includes upwardly extending concave surfaces. The present invention also discloses a method for installing the headliner assembly of the present invention. The invention and method of installation are adaptable for a variety of uses.

BACKGROUND OF THE INVENTION

Handicapped people in wheelchairs need extra headroom in transport vans so that their heads do not touch the roof. Consequently, traditional, standard-sized automotive vans must be converted into handicapped, wheelchair accessible vans by raising the roof. A conversion company removes the top of the van and secures a pre-made camper or conversion van top thereon. Thereafter, a headliner is installed into the camper top.

The use of headliner systems is known in the art. U.S. Pat. No. 4,020,207 is presented as an interior covering for automobile vehicles, containers, or the like that is a molded laminate structure. The interior covering of U.S. Pat. No. 4,020,207 consists of at least two sheets of cross-linked polyethylene foam. U.S. Pat. Nos. 5,866,235 and 5,660,778 disclose methods of producing fibers and structures that may be utilized in the manufacture of interior trim headliner substrate. The advantages of the headliner substrates presented in U.S. Pat. Nos. 4,020,207 and 5,866,235 and 5,660,778 may be offset by the necessity of financing the implementation of particular chemical manufacturing processes and molds.

U.S. Pat. No. 4,131,702 discloses a self-supporting molded component for lining the inside of an automobile. The component has a layered construction of polyethylene foam panels with projections such as nubs, ribs or wedges that are integrally molded to the component and function as reinforcing inserts to ease installation of the headliner into an automobile. Effective utilization of the molded component of U.S. Pat. No. 4,131,702 may require costly changes in the design of automobiles because the projections must be locked or clamped into corresponding elements of an automobile roof, which may require design and manufacturing changes in an automobile roof. Also, because installation requires each projection to be locked or clamped into a corresponding element, the relative ease of installation is not clear.

U.S. Pat. No. 4,840,832 discloses an automobile headliner which is formed from a batt of polymeric fibers compressed and molded into a predetermined contoured shape. The headliner is secured to the automobile roof using fastener strips of the hook-loop type. The substantial degree of flexibility in the headliner of U.S. Pat. No. 4,840,832 increases the difficulty of installation and brings to question the extent of resilience over time.

Attempts to produce a headliner that is self-supporting have resulted in the development of various types of substrates. However, these attempts, such as U.S. Pat. No. 4,020,207 (Alfter, et al.), U.S. Pat. No. 4,131,702 (Alfter, et al.), U.S. Pat. No. 4,358,883 (Gerring), U.S. Pat. No. 4,840,832 (Weiple, et al.) and U.S. Pat. No. 5,503,903 (Bainbridge, et al.), in their preferred embodiments, are not completely self-supporting and require some type of reinforcing supports. In fact, such support may be inadequate and/or may cause the headliner to be heavy, awkward to install, time consuming to install and expensive.

There continues to be a need for a headliner that is light-weight, manufactured from readily available materials, easy to install, quick to install, adequately supported, attractive and inexpensive. Accordingly, it is an object of the present invention to provide a unitary headliner for a vehicle, a transportation container or some other concave surface in an inexpensive manner, without the necessity of purchasing a mold, vacuum or gravity, or otherwise. It is also an object of the present invention to provide a headliner assembly that is semi-rigid and semi-flexible to facilitate easy installation and provide adequate support such that the shape and attractiveness of the headliner assembly are maintained for all upwardly extending concave surfaces, as well as unfinished two-dimensional surfaces.

In addition, it is a further object of the present invention to provide an inexpensive headliner assembly that can be easily produced from readily available materials such that specially designed tools, machines and materials are not required for production of the present invention, and one that may be easily installed and does not require costly changes in the design of automobiles.

SUMMARY OF THE INVENTION

The present invention incorporates a unitary headliner piece that can be made into an appropriate shape to fit the three or four different "pop-up" van tops currently widely used in the conversion van market. The present invention alleviates the high labor cost associated with van conversion, and makes installation of a headliner a quick and easy operation. GLAVAL Corporation of Elkhart, Ind., appears to be the largest van conversion company in the United States, and that company utilizes the old method of cutting one-quarter inch plywood or underlayment and fitting into the camper "pop-up" van top and then carpeting over it.

The present invention relates to a headliner assembly for the underside of a vehicle roof. The headliner assembly of the present invention includes a headliner piece that has a resilient semi-flexible substrate, the substrate having integrally hinged side sections that are formed when the substrate is bent. Additionally, described herein is a method for manufacturing and installing the headliner assembly.

To overcome the above-noted problems, the present invention is brought forth. In accordance with a preferred embodiment of the present invention, the above-stated objects, and other objects and advantages of the present invention, are addressed as follows. The foregoing and other advantages of the present invention will become apparent after reading the subsequent description taken in conjunction with the appendant drawings.

BRIEF DESCRIPTION OF THE DRAWINGS

FIG. 2 is a top plan view of an embodiment of an assembled headliner piece according to the present invention wherein the headliner piece includes a substrate with lining material attached to the lower surface of the substrate, and layers of some type of material positioned between the substrate and the lining material. The tabs shown are stapled onto the substrate.

FIG. 3 is a top view of a pre-cut pattern of an unassembled substrate for a headliner piece according to the present invention wherein formation of the side sections is indicated by the cutouts and the generally rectangular-shaped fold line, and each side section has at least one tab. The tabs at the side sections fold over and secure the side sections and conform the headliner piece to the vehicle roof.

DESCRIPTION OF THE PREFERRED EMBODIMENT(S)

Figure 1:
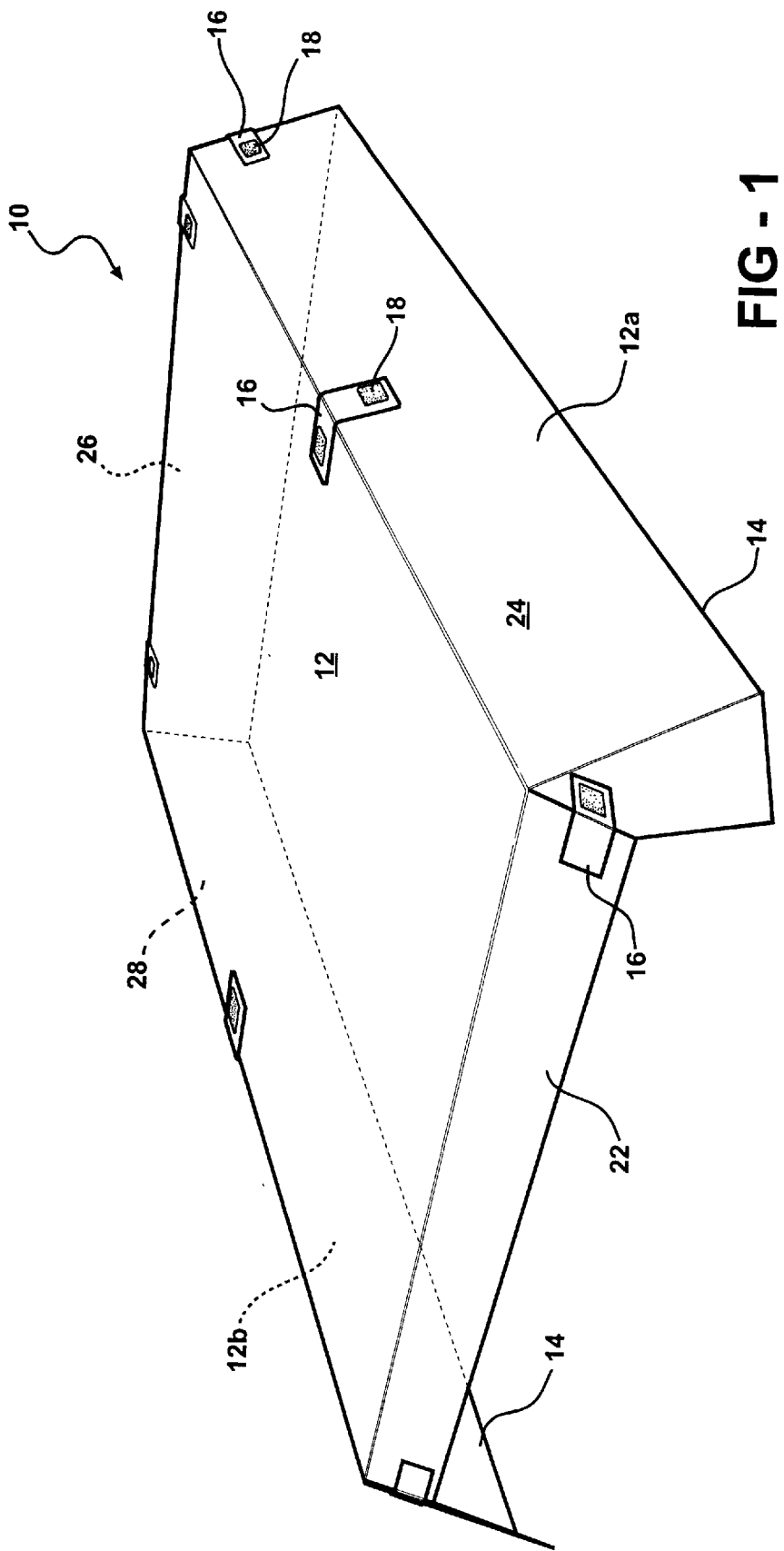
FIG. 1 is a perspective view of a preferred embodiment of an assembled headliner piece according to the present invention wherein a semi-flexible substrate has a lining material attached thereto. The substrate is scored and bent to form the side sections. The shape of the headliner piece is further maintained with tabs fastened to the substrate and attached to at least one side section. Pieces of a hook-and-loop fastener are attached to the tabs.

In accordance with practicing the present invention, a preferred embodiment concerns a headliner piece exemplified in FIGS. 1, 2 and 3. A unitary headliner piece of the headliner assembly of the present invention is generally indicated by the reference character 10. Another aspect of the present invention concerns a support unit exemplified in FIGS. 4 and 5 by the reference character 40. Still another aspect of the present invention is a method of manufacturing and installing a headliner assembly that includes the steps of manufacturing and installing the support unit 40 exemplified in FIGS. 4 and 5. The headliner piece 10 exemplified in FIGS. 1, 2 and 3 is discussed first. A discussion of the support unit 40 exemplified in FIGS. 4 and 5 follows. Finally, there is a discussion of a method of manufacturing and installing a headliner assembly. Like numerals refer to the same elements in all the Figures.

A preferred embodiment of the present invention, as shown in FIG. 1, is exemplified as an assembled headliner piece generally denoted by the numeral 10. As illustrated, the headliner piece 10 of FIGS. 1 and 2 includes a resilient, semi-flexible substrate 12 that has an upper surface 12a and a lower surface 12b. The substrate 12 is preferably pre-cut via die-cutting to form at least a first side section 22, a second side section 24, a third side section 26 and a fourth side section A 28. The semi-flexibility of the substrate 12 permits the side sections 22, 24, 26, 28 to bend away from the upper surface 12a of the substrate 12 such that the side sections 22, 24, 26, 28 are integrally hinged to the lower surface 12b of the substrate 12 and extend below the upper surface 12a of the substrate 12 when the headliner piece 10 is installed.

A lining material 14 attached to the lower surface 12b of the substrate 12 may extend over and beyond respective outer edges 22a, 24a, 26a, 28a of the side sections 22, 24, 26, 28. The substrate 12 may be scored along a fold line 30 for bending along the fold line 30 to assist in the formation of the side sections 22, 24, 26, 28 and the integral hinging of the side sections 22, 24, 26, 28 to the substrate 12, as can be seen in particular detail with regard to FIG. 3. The headliner piece 10 of FIGS. 1 and 2 may be held in shape with tabs 16 stapled or otherwise fastened to the substrate 12 along the side sections 22, 24, 26, and 28. In the embodiment exemplified in FIG. 1, a series of hook-and-loop fastener pieces 18 adhered and/or fastened with staples to the tabs 16 serve to ease installation of the headliner piece 10 within a conversion van as long as the loop pieces are mated with the hook pieces that are attached to the support unit 40.

Referring to the embodiment of FIG. 2, the headliner piece 10 includes a substrate 12 with a lining material 14 such as carpet, or fabric or any other appropriate material, covering the lower surface of the substrate 12 as well as the outer edges 22a, 24a, 26a, 28a of the respective side sections 22, 24, 26, 28 and extending onto the upper sides 22b, 24b, 26b, 28b of the side sections 22, 24, 26, 28, respectively. There is also a layering material 34 positioned between the lower surface of the substrate 12 and the lining material 14. Such layering material 34 may provide a variety of services, including providing padding, acoustical absorption and heat insulation. Tabs 16 are shown in place as being stapled onto the substrate 12 such that tabs 16 assist in holding the form of the substrate 12 once the substrate 12 is bent into position to conform to the underside of the vehicle roof. In FIG. 2, several tabs 16 are connected to the upper surface 12b of the substrate 12 and fold over and secure side sections 22, 24, 28 to the upper surface 12b of the substrate 12. Tab 16 connects side section 22 to side section 24 by folding side section 22 over side section 24 and securing side section 22 to side section 24. In a like manner, tabs 16 connect side section 24 to side section 26, and side section 26 to side section 28. The hook-and-loop fastener 18 eases the installation of the headliner piece 10 to the vehicle roof. Although the embodiments of FIGS. 1 and 2 show the hook-and-loop fastener 18 attached to tabs 16, the loop fastener pieces are effective for easy installation as long as the loop fastener pieces are positioned to mate with complementary hook fastener pieces that are attached to a support unit 40.

Referring to the embodiment of FIG. 3, there is shown a die-cut pattern of a generally rectangular substrate 12. Two symmetrical corners 26c, 26d at the outer edge of side section 26 and adjacent to outer edges 24a and 28a, respectively, may be cut out and the substrate 12 scored along a fold line 30 such that bending and folding along the scored fold line 30 assists in defining a generally rectangular shape in the upper surface of the substrate 12, and assists in formation of the side sections 22, 24, 26 and 28. In the preferred embodiment, bending and folding the semi-flexible, semi-rigid substrate 12 along the fold line 30, and shaping the side sections 22, 24, 26, 28 to the contours of the vehicle roof and later connecting the side sections 22, 24, 26, 28, respectively, with tabs 16, forms a headliner piece 10 suitable for either a long or short Ford 1500 van having a Viking WPG Executive styling "pop-up" top.

As depicted in FIG. 3, the substrate 12 begins as a substantially flat slab of material, which may be made preferably of corrugated plastic, such as a polypropylene or other plastic or polymeric material. The substrate 12 may also be constructed of a semi-rigid foam piece, a composite slab, a corrugated paper or wood fiber material panel, extruded corrugated materials, or any other suitable material. The preferred material for the substrate 12 is a polypropylene corrugated plastic that passes the Federal Motor Burn Safety Standards (FMBSS) test, known as the fire retardation test; also, polypropylene corrugated plastic is moisture impervious and does not experience reduced rigidity after exposure to moisture. Corrugated polypropylene plastic may also pass the National Mobility Equipment Manufacturers Dealers Association (NMEMDA) standards test.

As the preferred material is corrugated, it may be scored and bent, thereby substantially alleviating any need for molding. When the substrate 12 is made of this particular preferred corrugated polypropylene plastic, and the substrate 12 is cut at the fold line 30, the corrugated portion allows a "living hinge" to be formed, such that the headliner piece 10 is bendable at predetermined positions to conform to the underside of the vehicle roof. The headliner piece 10 of the present invention is preferably semi-flexible to provide for easy and relatively inexpensive installation. It is sufficiently lightweight and rigid to permit relatively easy and swift installation. The rigidity and support unit 40 features of the present invention provide adequate support, permitting the retention of contours in the headliner piece 10.

Figure 4:
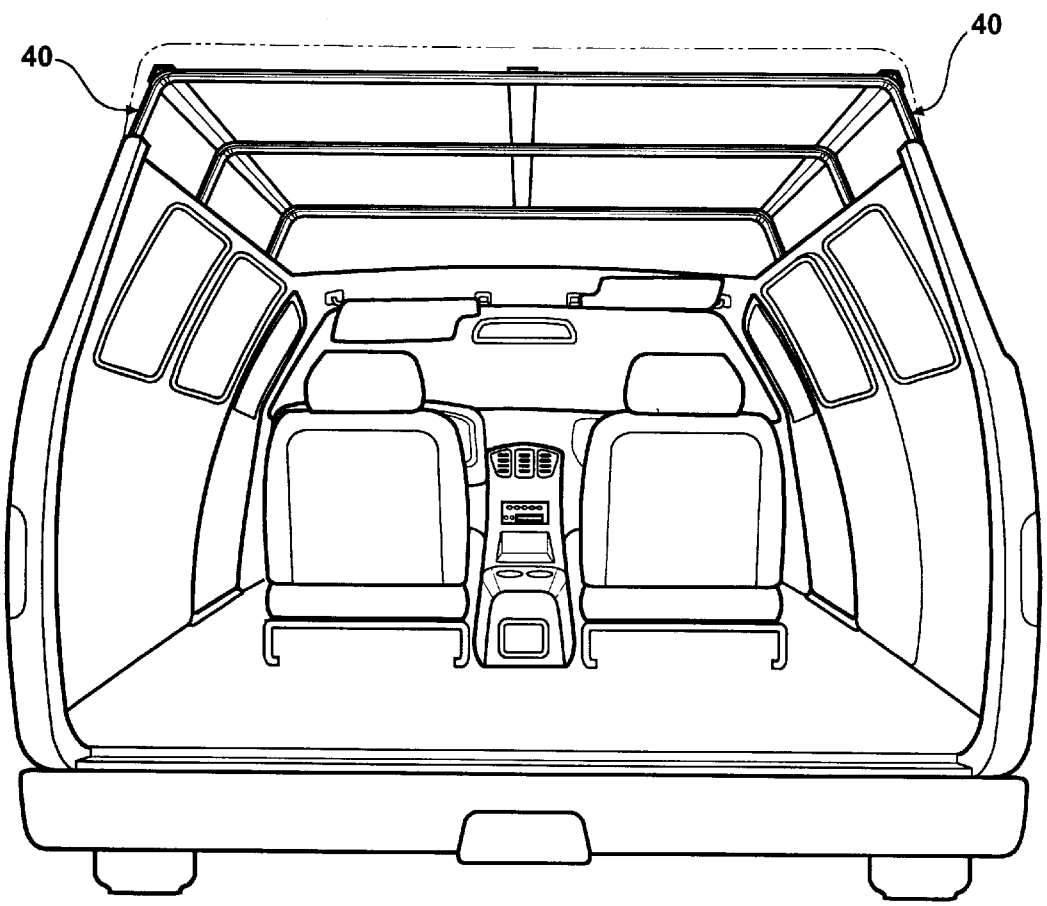
FIG. 4 is a perspective view of an embodiment of a support unit according to the present invention as viewed from a rear entrance of a vehicle with a conversion top. The support unit is a roll cage attached to the underside of the vehicle roof to provide support for a headliner piece.
Figure 5:
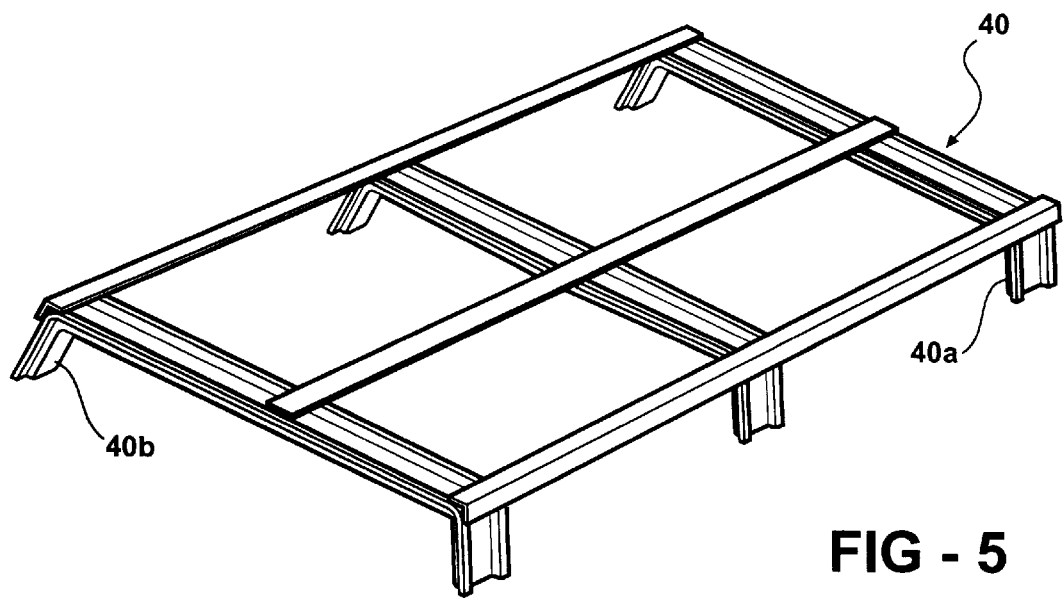
FIG. 5 is a perspective view of an embodiment of a support unit according to the present invention wherein the support unit is a roll cage and is unattached to a vehicle roof.

Referring last to the embodiments of FIGS. 4 and 5, a support unit 40 is shown which is necessary to provide support for the headliner piece 10 when the present invention is used in a wheelchair accessible conversion van. In FIG. 4, a van is shown from its rear, and placement of the support unit 40 is illustrated. The support unit 40 in FIG. 4 is a roll cage. The support unit 40 has a back side 40*a* and a front side 40*b*. The back side 40*a* of the support unit 40 is securely attached to the vehicle roof to support the headliner piece 10 when the upper surface of the substrate 12 of the headliner piece 10 is attached to the front side 40*b* of the support unit 40.

Looking again to embodiment of FIG. 5, a support unit 40 is shown prior to its installation and welding into a vehicle roof. The support unit 40 of FIG. 5 is a roll cage that provides good, solid contact points on the front side 40*b* of the roll cage support unit 40 for receiving the headliner piece 10.

Although this invention has been shown and described with respect to preferred embodiments thereof, it will be appreciated and understood by those skilled in the art that various changes in form and detail thereof may be made without departing from the spirit and scope of the claimed invention. Therefore, the breadth of the present invention is to be limited only by the following appendant claims.

What is claimed is:

1. A headliner assembly for an underside of a vehicle roof, comprising:
    a headliner piece having a resilient semi-flexible substrate, the substrate having an upper surface and a lower surface, said semi-flexible substrate being shapeable and forming at least a first side section, a second side section, a third side section, a fourth side section, and an integral middle section connecting the four side sections,
    the semi-flexibility of the substrate permitting the side sections to bend away from the upper surface of the substrate such that the side sections are integrally hinged to the substrate and extend below the upper surface of the substrate when the headliner piece is installed; and
    each of the side sections having respective outer edges, the substrate being further pre-cut to remove two corner pieces located at the outer edge of one of the side sections to assist in contouring the headliner piece.

2. The headliner assembly of claim 1, wherein the substrate is a semi-rigid material.

3. The headliner assembly of claim 1, wherein the substrate is made of a polymeric material.

4. The headliner assembly of claim 1, wherein the substrate is made of plastic.

5. The headliner assembly of claim 1, wherein the substrate is made from an extruded corrugated material.

6. The headliner assembly of claim 1, wherein the substrate is made of corrugated polymeric material.

7. The headliner assembly of claim 1, wherein the substrate is made of corrugated polypropylene.

8. The headliner assembly of claim 1, wherein the substrate is made of a material selected from the group consisting of cardboard, corrugated paper, and wood fiber panel material.

9. The headliner assembly of claim 1, wherein the substrate is made from a semi-rigid foam.

10. The headliner assembly of claim 1, wherein the substrate is made from a material that contains cork.

11. The headliner assembly of claim 1, wherein the upper surface and the lower surface of the substrate are laminated.

12. The headliner assembly of claim 1, wherein the substrate is generally rectangular in shape.

13. The headliner assembly of claim 1, wherein the substrate further comprises at least one tab, the tab being designed to fold over and secure at least one side section to at least one other side section and thereby hold the form of the substrate such that the substrate conforms to the vehicle roof.

14. The headliner assembly of claim 13, wherein the tab is connected to the upper surface of the substrate and folds over and secures at least two of the side sections.

15. The headliner assembly of claim 13, wherein the tab is connected to one of the side sections and folds over and secures to at least one other side section.

16. The headliner assembly of claim 1, further comprising at least two mateable tabs, the tabs being on adjacent side sections and fastening at least two side sections of the substrate together upon the tabs folding over and securely mating with one another.

17. The headliner assembly of claim 1, further comprising a lining material covering the lower surface of the substrate.

18. The headliner assembly of claim 17, wherein the lining material is a fabric.

19. The headliner assembly of claim 17, wherein the lining material is carpet.

20. The headliner assembly of claim 17, further comprising at least one layer of a layering material positioned between the lower surface of the substrate and the lining material.

21. The headliner assembly of claim 20, wherein the layering material provides acoustical absorption.

22. The headliner assembly of claim 20, wherein the layering material has thermal insulating features.

23. The headliner assembly of claim 20, wherein the layering material provides padding.

24. The headliner assembly of claim 1, further comprising a generally rectangular shaped fold line to assist formation and hinging of the side sections when the substrate is bent.

25. The headliner assembly of claim 24, wherein the fold line on the substrate is scored.

26. The headliner assembly of claim 1, further comprising a support unit for the headliner piece, the support unit having a back side and a front side, and the support unit being shaped such that the back side of the support unit attaches to the underside of the vehicle roof and the front side of the support unit attaches to the upper surface of the substrate and provides support for the headliner piece.

27. The headliner assembly of claim 26, wherein the support unit is a roll cage.

28. The headliner assembly of claim 26, wherein the support unit is connected to the inside of the vehicle roof by welding.

29. The headliner assembly of claim 1, further comprising a hook-and-loop fastener having a hook piece and a loop piece, the pieces being attached to the substrate and the underside of the van roof in a complementary fashion to secure the upper surface of the substrate to the underside of the van roof.

30. A method of manufacturing and installing a headliner piece for a vehicle roof, comprising:

providing a resilient semi-flexible substrate;

forming at least a first side section, a second side section, a third side section and a fourth side section, said side sections each having an outer edge, said sections also being formed from the semi-flexible substrate;

forming pre-cut corner pieces located at the outer edge of one of the side sections to assisting in contouring the headliner piece;

bending the side sections to contour the substrate; and installing the substrate by attaching the substrate to the vehicle roof.

* * * * *